UNITED STATES PATENT OFFICE.

PAUL FLURY, OF EL PASO, TEXAS.

PROCESS OF TREATING SPEISS.

SPECIFICATION forming part of Letters Patent No. 486,330, dated November 15, 1892.

Application filed January 9, 1892. Serial No. 417,550. (No specimens.)

*To all whom it may concern:*

Be it known that I, PAUL FLURY, of El Paso, in the county of El Paso and State of Texas, have invented a new and Improved Process for Treating Speiss, of which the following is a full, clear, and exact description.

The object of the invention is to provide a new and improved process for treating speiss to obtain the valuable metals contained therein.

Speiss, as is well known, is the by-product of lead-furnaces, and is composed of iron and arsenic or nickel-iron and arsenic, usually containing silver and gold.

To carry my method into effect, I proceed as follows: The speiss is crushed to grain size and roasted in an open calcining-furnace, and then the roasted speiss is mixed with sulphur and heated again with a current of air to carry off arsenious acid and sulphide of arsenic, both of which are condensed in flue dust-chambers. The heating of the roasted speiss and sulphur is preferably carried on in a furnace which is either a rotary or a stationary calcining-furnace with stirring apparatus; but the fire is arranged so as not to come directly in contact with the material under treatment, which latter is only heated. The furnace must also be arranged so that the fire-gases do not mix with the arsenic fumes. When the roasted speiss mixed with sulphur is heated to a gentle red heat, the arsenious acid is disengaged in the form of heavy clouds, which are carried off by blast and condensed in flue dust-chambers. The air is blown over the material and not through it, and the material is stirred up, but is kept in the state of a loose powder through all the various stages of the process.

Having thus fully described my invention, I claim as new and desire to secure by Letters Patent—

1. The herein-described process of treating speiss, consisting in roasting the crushed speiss, then mixing the roasted speiss with sulphur and heating the mixture, then passing a current of air over the same, and finally condensing the fumes thereof, as specified.

2. The herein-described process for treating speiss, consisting of first crushing the speiss to grain size, then roasting it in a calcining-furnace, then mixing the roasted speiss with sulphur, then subjecting the mixture to a gentle heat and passing a current of air over the same to carry off arsenious acid and sulphide of arsenic, and then condensing the latter in flue dust-chambers, substantially as shown and described.

PAUL FLURY.

Witnesses:
GEO. H. HIGGINS,
DAN R. STEDHAM.